July 13, 1937.    H. C. PEFFER ET AL    2,086,778
METHOD OF PRODUCING OXYGEN FROM AIR
Filed Oct. 19, 1934    2 Sheets-Sheet 1
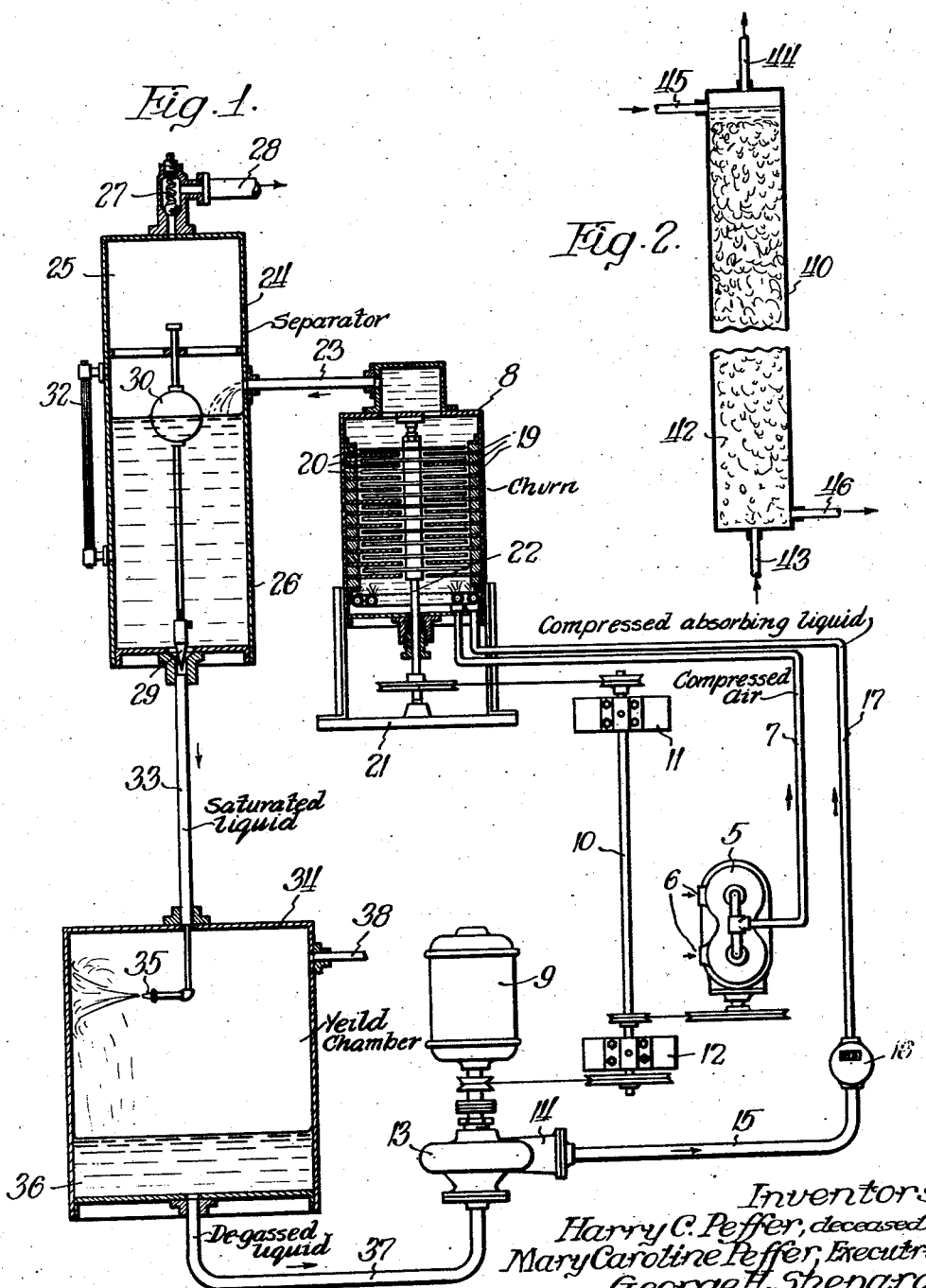

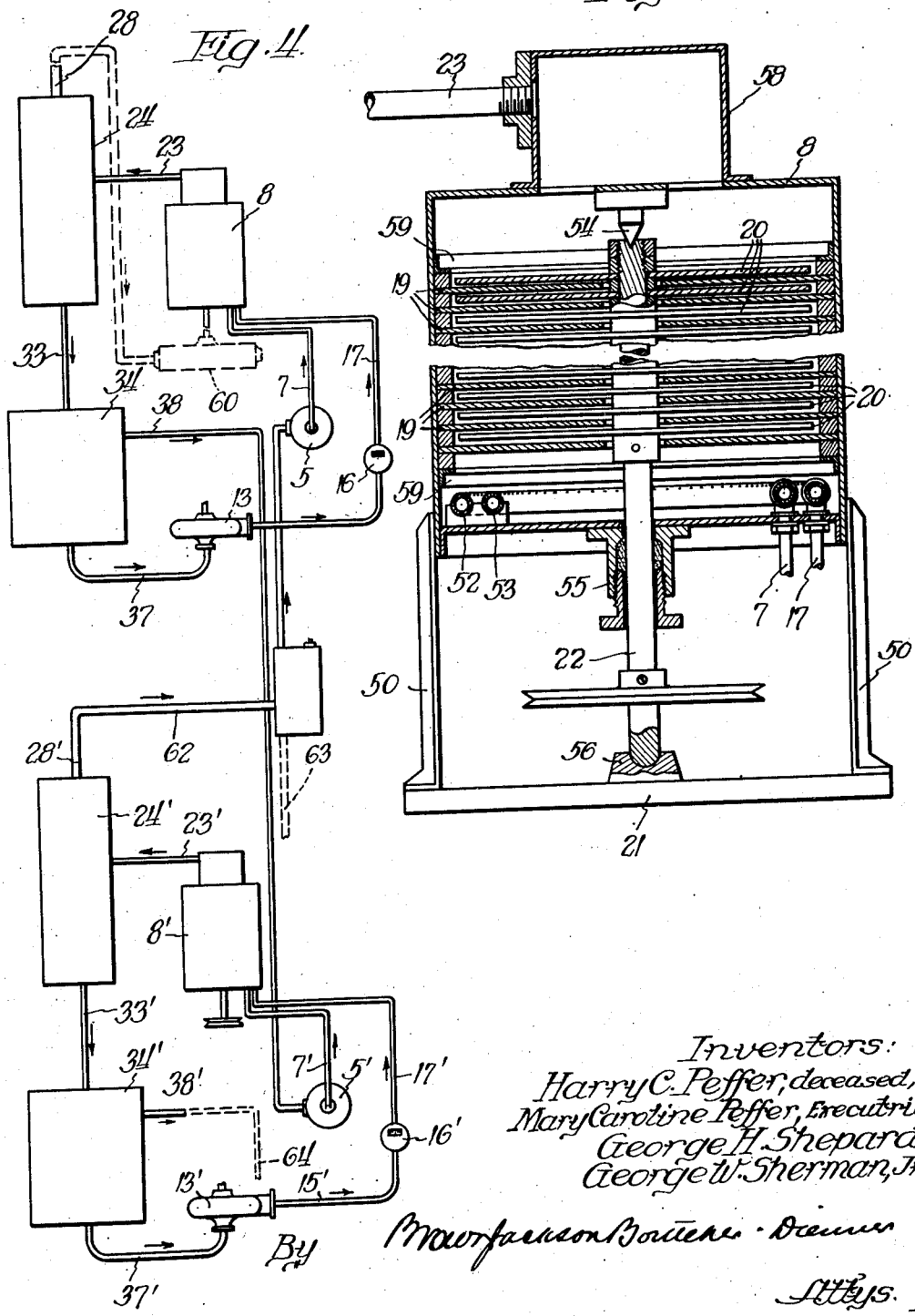

Patented July 13, 1937

2,086,778

UNITED STATES PATENT OFFICE 2,086,778

METHOD OF PRODUCING OXYGEN FROM AIR

Harry C. Peffer, deceased, late of West Lafayette, Ind., by Mary Caroline Peffer, executrix, West Lafayette, Ind., and George H. Shepard and George W. Sherman, Jr., West Lafayette, Ind.

Application October 19, 1934, Serial No. 749,012

9 Claims. (Cl. 23—221)

This invention relates to a method of and means for producing oxygen from air, and is more particularly directed to a method of producing oxygen-rich gas by preferential solubility of air in an absorbent liquid.

The production of oxygen-rich gas has become of increasing importance in recent years, but up to the present time its use has been materially restricted because of the relatively high cost of producing such gas. It is within the contemplation of the present invention to produce oxygen-rich gas for use in oxygen rooms in hospitals, in oxy-acetylene and other types of welding equipment, in metallurgical operations, for production of high grade iron from blast furnaces, and as a preliminary to the Linde compression and liquefaction cycle, as well as for use in all other situations requiring oxygen-rich gas.

The present invention, in its preferred embodiment, is directed to a method of producing oxygen-rich gas by the compression of atmospheric air and introduction of this air under pressure into intimate interface contact with an absorbent liquid in which the oxygen and nitrogen, the two main constituents in air, are differentially soluble, that is, a liquid into which the oxygen is absorbed more rapidly than the nitrogen. This liquid, with the absorbed gas therein, is then conducted to a yield chamber and the pressure reduced considerably, resulting in liberation of the gas from the liquid. Because of the difference in rates of solubility of oxygen and nitrogen, the liberated gas will have a considerably higher percentage of oxygen therein than that present in atmospheric air, and consequently an oxygen enriched gas is thereby produced.

By increasing the number of consecutive compression and absorption stages, the percentage of oxygen in the yield gas will be successively increased up to the point where the percentage of oxygen is above the critical saturation point of the absorbing liquid employed. Thus it is possible to provide for yields of varying percentages of oxygen-rich gas, depending upon the particular type of gas desired.

In addition, the present invention contemplates an oxygen gas producing process in which the same absorbing medium may be used and reused without the necessity of regeneration thereof, and in which the waste, unabsorbed gas may be employed as a source of energy for part of the process, or for other purposes, thereby greatly increasing the economy of operation of the process.

Another economical feature of the present invention resides in the return of unabsorbed gases from the second and succeeding stages of the process to the intake for lower stages, since, inasmuch as the oxygen content of these gases is greater than in atmospheric air, the admixture of this returned gas with the air in the lower compression stage produces a higher oxygen yield in the lower stages of the process. Obviously the return from higher stages could be returned to any desired lower stage.

We have found that intimate interface contact between the liquid and the compressed gas is essential for obtaining rapid absorption of oxygen, and a primary object of the present invention is the attainment of an efficient contact between constantly changing minute particles of air and the liquid, in order to present as much of the air surface as possible to the liquid within mechanical limitations of the structure involved. Inasmuch as the phenomenon of preferential solubility of two gaseous constituents in a liquid is controlled by the establishment of an equilibrium condition at the gas-liquid interface of the gas bubbles, we find that by increasing the rate of diffusion of the more soluble gaseous component from the interior of the gas bubble to the interface of the bubble with respect to the rate of travel of the bubble through the liquid, the equilibrium condition is not reached as quickly, and that by thus producing a large and constantly changing or diffusing reacting surface, a strongly preferential solution is obtained.

It is an object of the present invention to provide means for continuously breaking up and minutely subdividing the gas stream in order to increase this rate of diffusion and consequently the rate of absorption of the preferred constituent.

Also, in carrying out the present invention, we provide an absorbing medium which is nonpolar, inasmuch as nitrogen and oxygen are both nonpolar, and which also is not readily volatilized. We have found that water, with or without the addition of substances possessing apparent catalytic properties with respect to increasing the solubility of oxygen in the water, may be successfully employed in our process. However, the medium which we have found most suitable for this purpose is a hydrocarbon product, such as mineral seal oil, kerosene, "signal oil", such as is used in railroad signals, or a mixture of any of the distillates of the petroleum series compounds above kerosene. These substances are nonpolar and appear to have the greatest absorption characteristics of the nonpolar substances with which we have experimented. In addition, these compounds have a relatively narrow temperature range of distillation, which is extremely desirable as the compounds are not readily volatilized.

Another advantage resulting from our process is that the percentage increase yield in oxygen is proportional to the stages of compression, and can therefore be readily determined up to the practical limits of concentration of oxygen in the absorbing medium.

Other objects and advantages of our invention will appear more fully from the following detailed description which, taken in connection with the accompanying drawings, will disclose to those skilled in the art the construction and operation of a preferred embodiment of the invention.

In the drawings:

Figure 1 is a diagrammatic view showing one stage of the process, and the particular apparatus employed in a preferred embodiment thereof;

Figure 2 is a view illustrating a modified type of mixing apparatus;

Figure 3 is a detailed sectional view of the mixing churn shown in Figure 1; and Figure 4 is a flow diagram illustrating a multi-stage process embodying the teachings of the present invention.

Referring now in detail to the drawings, we have indicated in Figure 1 an air compressor 5, which is provided with the air intake 6 and with the compressed air line 7 leading therefrom to the bottom of a mixing churn indicated generally at 8.

Any desired type of compressor may be used, and the compressor is ordinarily driven by a suitable driving connection with an electric motor 9, such as through the countershaft 10 supported between bearings 11 and 12. The particular manner of driving the compressor is optional, and we do not intend to be limited to the exact arrangement shown and described herein. The motor 9 preferably is also adapted to drive a liquid pump 13, which pump has its outlet 14 connected by the conduit 15 to a meter 16, and from the meter 16 a conduit 17 leads to the churn 8. The particular arrangement of the pump 13 and of the compressor 5 is optional in the present invention, the primary purpose of these elements being for the purpose of supplying liquid and air under pressure to a mixing churn. It is to be understood that the meter may be eliminated, if desired, without in any way altering the operation of our process.

The mixing churn 8, in a preferred embodiment of the invention, comprises a plurality of fixed plates 19 between which are inserted a plurality of rotating discs 20 mounted upon a common shaft 22 supported upon a base 21, the shaft 22 being, in this embodiment, driven by a pulley connection with the countershaft 10. The discs are preferably spaced relatively closely together, in order to provide for minute subdivision and breaking up of the liquid and air particles introduced from the conduits 7 and 17. If desired, the disc surfaces may be roughened or corrugated to aid in the breaking up process.

These conduits preferably encircle the base of the churn 8, and are provided with a plurality of openings or jets for discharging the liquid and air over the entire lower area of the churn, whereby it is forced upwardly between the rotating discs and the fixed plates, being brought into intimate contact and the interface surfaces thereof being constantly changed and broken up in order to provide for complete diffusion and movement of the entire portions of the gas bubbles into contact with the liquid particles. The moving plates 20, being closely adjacent the stationary plates 19, grind or triturate the mixture of gas and liquid between them, thereby producing a high degree of subdivision of gas and liquid and producing an enormous number of intimate, constantly changing, contacts between relatively minute particles of gas and liquid of great effectiveness. The liquid which is the external phase of the mixture tends to adhere to the plates and is thereby sufficiently controlled by the relative movement of the two plates that the mixture of gas and liquid is literally ground and at the same time violently agitated between the plates. Any desired arrangement to effect this result may be employed.

The liquid which we employ in a preferred embodiment of the invention is a mineral seal oil, such as "signal oil", or a mixture of this mineral seal oil and kerosene, or kerosene alone. As pointed out, we have found that any of the petroleum distillates above kerosene may be employed, since it has been found that the hydrocarbons are capable of the greatest preferential absorption of oxygen from air of the nonpolar substances with which we have experimented. This seal oil, or similar medium, is thus introduced into the churn 8 through the conduit 17, and is intimately mixed with the compressed air, oxygen and nitrogen from the air being absorbed into the liquid as it passes through the churn 8.

Ordinarily atmospheric air is composed of oxygen and nitrogen, with a relatively small percentage of carbon dioxide and ammonia. If desired for special purposes, the carbon dioxide and ammonia may be removed from the air prior to its admission to the compressor 5, but we have found that for practical purposes the percentages of these constituents is so small as to be practically negligible in the process disclosed.

From the churn 8, the gas and liquid mixture passes outwardly through the conduit 23 into a waste separation chamber indicated generally at 24. This waste separation chamber has a waste gas chamber 25 and a liquid reservoir portion 26 therein, and the unabsorbed or undissolved gas which has passed through the churn 8, and which has not been absorbed into the liquid, is liberated into the chamber 25, and passes outwardly therefrom through the automatic pressure control valve 27 to any suitable point, as indicated by the conduit 28.

If desired this liberated gas, which is under a considerable pressure, inasmuch as the pressure in the churn 8, in a preferred embodiment of our application, is approximately 75 to 135 pounds per square inch, and the gas therefore liberated through the valve 27 is still under a pressure of from 50 to 75 pounds per square inch, or more, might be employed to drive the churn, or may be employed for any other suitable purpose, inasmuch as the energy remaining in this compressed gas is considerable.

The liquid, with the absorbed gas therein, which flows into the reservoir 26, is withdrawn from the reservoir through the valve 29, which is controlled by means of the float 30, the level of the liquid being ascertained by means of the gauge 32 mounted upon the chamber 24. Preferably this level is maintained below the inlet of the pipe 23.

The liquid, with the air absorbed therein, and maintained under a considerable pressure, is passed through the conduit 33 into the yield separation chamber 34, which chamber may be of any desired size, and in the illustrated embodiment of the invention, is preferably cylindrical in cross section. The liquid with the absorbed gas therein is discharged against the sidewall of this chamber by means of the jet 35, or in any manner which spreads it into a thin sheet, producing a splashing effect which serves to liberate the absorbed gas from the liquid, the chamber being maintained under substantially normal atmospheric pressure. The liquid, with the absorbed gas removed therefrom, is collected at the bottom of the chamber 34 in the sump indicated at 36, and is withdrawn from this sump through the conduit 36 by the suction of the pump 13, being then redelivered through the meter 16 to the mixing churn 8.

Preferably the quantity of liquid employed in the cyclic operation of the process is sufficient to maintain enough liquid in the sump 36 to prevent short circuiting of the pump 13.

We have found that with the use of mineral seal oil, kerosene, or other similar liquids, they may be used over and over again, for long periods of time, without requiring any reactivation or regeneration except filtering occasionally for removing dust and dirt particles carried thereinto by the air stream with which the liquid comes into contact.

The liberated gas in the yield separation chamber 34 is conducted from adjacent the top of the chamber through the delivery pipe 38, and is passed into suitable containers, or to the second stage of the process, if a higher yield of oxygen enriched gas is desired, or directly to the point of use.

In a preferred embodiment of our invention, we have found that with the use of mineral seal oil, and atmospheric air under pressure of substantially 45 pounds, approximately 30% by volume of the air is absorbed into the liquid in the mixing churn 8, when the discs in the churn are rapidly rotated, that is, at approximately 800 to 1200 R. P. M. and are set for a clearance between the fixed discs and the rapidly rotating discs of approximately 0.06 of an inch. It will be noted that the air and liquid proceed in parallel flow between the discs, and the discs provide for continuous breaking up of the relatively large bubbles passing through the liquid, and minutely subdividing these bubbles without altering other conditions of the process.

The liquid, with the absorbed portion of the air stream, as it is passed into the waste separation chamber 24, is forced outwardly through the conduit 33. The other portion of the air, which is unabsorbed, is discharged through the discharge pipe 28. When the liquid is splashed or sprayed against the surface of the chamber 34, under reduced pressure, liberation of the absorbed gas occurs, and of the portion of gas which has been absorbed, approximately 30% of this gas is oxygen. In other words, the first stage of the process produces oxygen-rich gas containing about 30% oxygen and 70% nitrogen.

It is obvious that other means of separating the absorbed gas, which is in the liquid under pressure, from the liquid may be employed in place of the jet 35, such as by centrifuging, imposing variously curved surfaces in front of the jet, providing rotating discs against which the jet impinges for centrifugal separation at the same time that splashing occurs, or in any other suitable or desired manner.

The process is also capable of being employed with water being used as the absorbing medium. In this case, we have found that by adding from 3 to 4 percent of sugar to the water, the absorption of oxygen is somewhat increased.

With the use of water as the absorbing medium, we have found that best results are obtained by the use of the mixing apparatus shown in Figure 2. This comprises a gravel bed confined within a relatively long cylindrical pipe indicated at 40, the gravel being shown at 42, and comprising washed pebbles which are capable of passing through a No. 8 mesh screen but not through a No. 12 mesh screen. The length of the cylindrical pipe 40 is substantially seven feet compared with a diameter of approximately three or four inches, in order to provide a long contacting path between the gas and the air. However, it is to be understood that any suitable pebble bed may be employed for this purpose.

The inlet for the compressed air or gas is indicated at 43, and the gas passes between the interstices of the pebbles within the cylinder 40 and is ejected through the outlet 44. At the same time, the water, with or without sugar added thereto, is injected at 45, and passes in counter-current contact with the air downwardly through the pebble bed 42, being withdrawn at 46. This counter-current contact between the air and the liquid, together with the breaking up and minute subdivision of the air particles by reason of the closely packed gravel bed, results in intimate gas liquid interface contact, resulting in maximum absorption of the oxygen by the liquid. However, the use of a hydrocarbon of the nature specified provides a much richer oxygen-gas mixture, with less power input, and the rate of yield of the oxygen-rich gas increases.

In this connection, it should be noted that by increasing the temperature of the hydrocarbon mineral seal oil, the rate of yield of the oxygen-rich gas is increased, at least within the range from approximately 9 to 40 degrees, centigrade.

In Figure 3 we have disclosed, in detail, the construction of the mixing churn 8. The pipes 7 and 17, conveying the compressed air and the absorbing liquid, respectively, to the churn 8, enter through suitable fittings into coiled pipe members 52 and 53, which are provided, along their upper surfaces, with a plurality of spaced discharge portions or jet openings for discharging the compressed air and liquid over the entire lower projection of the churn. In the lower part of the churn the injection of liquid and gas produces a coarse mixture of gas and liquid, which mixture of gas and liquid is then ground or triturated into an extremely fine mixture of gas and liquid and at the same time violently agitated by the relative movement of the plates 20 with respect to the plates 19. It will be noted that the shaft 22 extends substantially centrally through the churn, and is pivoted at its upper end on the bearing 54, and at its lower end extends through the packing seal indicated generally at 55 and is supported upon the thrust bearing 56 carried by the base 21 of the churn. The base 21 is also provided with the structural supporting members 50 for holding the churn in position, the shaft 22 being provided between the seal 55 and the bearing 56 with a pulley for the purpose of rotating the same from a suitable driving source.

The upper end of the churn is provided with a cap member 58, which is adapted to receive the liquid after it has passed through the churn and has absorbed the gas thereinto, and also receives the unabsorbed gas, the gas and liquid mixture being passed outwardly from the churn through the conduit 23 to the waste gas separator. The discs 20 mounted upon the shaft 22 are spaced relatively closely together, and are adapted to rotate between alternate pairs of plates 19, which plates are of circular form and provided with a small opening adjacent the external periphery of the shaft 22 to provide a passageway for the gas and liquid working from the bottom of the churn upwardly. In the same manner, the plates 20 are of a diameter slightly smaller than the diameter of the supporting structural members 59 which support the plates in position, in order that a path may be provided adjacent the end of each of the plates for allowing progress of the gas and liquid upwardly through the churn.

In Figure 4 we have shown, somewhat diagrammatically, the flow cycle for the adaptation of our invention to a two stage or higher process. In this diagrammatic showing, the gas from the compressor 5 is pumped, together with the liquid from the pump 13, into the churn 8, and passes through the same successive steps as described in connection with Figure 1. However, from the waste delivery pipe 28, through which the unabsorbed gas is delivered under a substantial pressure from the waste separation chamber 24, we have shown, diagrammatically, the transmission of this gas to a suitable turbine 60 which is provided for operating the churn 8. Thus the energy in this compressed gas may be economically employed to deliver a part of the energy required in the process.

Also, it will be noted that the delivery pipe 38 from the yield separation chamber 34 is extended downwardly and enters a second compressor 5' in the second stage of the process. Corresponding portions of the second stage of the process are identified by the primed reference numerals corresponding to the reference numerals of the first stage of the process. However, it will be noted that the pipe 38 is adapted to deliver the oxygen enriched yield gas from the yield separation chamber 34 to the compressor 5' of the second stage, instead of atmospheric air, which is admitted to compressor 5 of the first stage.

From this compressor, the oxygen-rich gas is passed through the same cycle of operation as the compressed air undergoes in the first stage, and the unabsorbed oxygen-rich gas leaving the churn 8' and delivered to the waste separation chamber 24' is ejected through the waste delivery pipe 28'. However, this undissolved gas which is liberated, due to the fact that the gas passed into the compressor 5' is rich in oxygen, is still possessed of more oxygen than ordinary atmospheric gas, and therefore we provide the conduit indicated diagrammatically at 62 for returning this gas, which is under substantial pressure, to the compressor 5 of the first stage, whereby this gas under pressure introduced into the compressor 5 is admixed with the atmospheric air, giving a slightly better percentage of oxygen in the first stage of the process as this compressed mixture passes into the churn 8. This correspondingly produces a higher yield of oxygen-rich gas in the yield separation chamber 34 of the first stage, and consequently the economy of the process is greatly increased by this re-delivery of the oxygen-rich waste gas from the waste separation chambers of the second or successively higher stages of the process to the compressor for the first stage or successively higher stages of the process. Thus, we have diagrammatically indicated at 63 a conduit for conducting the waste gas from a third stage of the process into the conduit 62, whereby this unused oxygen-rich gas may also be introduced into the first stage compressor, or into any higher stage below the stage in which this gas is obtained.

The gas from the yield separation chamber 34' of the second stage of the process is expelled through the delivery pipe 38', and may be either collected in suitable containers, for future use, or may be delivered, as diagrammatically shown by conduit 64, to a third stage or may be delivered directly to the point of use, and consequently it is apparent that the stages of compression and absorption of the gas may be increased, producing, within practical limits of concentration of the absorbing liquid, increasing yields of oxygen-rich gas. Thus, while the gas delivered from the compressor 34 in the first stage contains only approximately 30% oxygen, the percentage in the second stage approaches a gas having a considerably higher oxygen content, depending upon the absorbing medium employed. In the third stage, the oxygen percentage is increased to an appreciably higher value. However, we have found that a practical limit of concentration of the absorbing liquid is reached at approximately 75% oxygen, and that the process cannot be carried out with any further success beyond the fourth or fifth stage of compression and absorption to produce any substantial increase in either percentage or yield of oxygen gas. In fact, the quantitative yield of gas drops off continuously in each stage of compression. This is due to the fact that the absorbing liquid is capable of absorbing only approximately 30% of the total volume of gas passed thereover.

It is thus apparent that we have provided a process for producing oxygen-rich gas from atmospheric air, comprising compression of the air, and intimate contacting of minute particles of the air stream with minute particles of an absorbing liquid, in order to absorb, by preferential solubility, sufficiently more oxygen into the liquid than nitrogen to produce an oxygen enriched gas.

By preferential solubility we refer to the phenomenon whereby the absorbing liquid is capable of absorbing the oxygen at a greater rate than the nitrogen, whereby during a given period of contact, more oxygen will be dissolved into the solution than nitrogen, and therefore, referring to a preferred embodiment of our invention, of the 30% of the total volume of compressed air that is absorbed, which normally contains nitrogen in the ratio of about 4 to 1 with respect to oxygen, the absorbed gas now contains nitrogen in the ratio of approximately 2 to 1 with respect to oxygen. However, as the partial pressure in the solution of the more soluble component, that is, oxygen, increases, the relative rate of absorption falls off, due to the higher partial pressure in the gaseous stage of the less soluble component. Thus a practical limit of concentration is reached after a number of successive stages of the process.

It is to be understood that the particular structures which we employ in carrying out the process are optional in character, and are disclosed only for the purpose of describing a preferred embodiment of the invention. The basic principles of the invention are capable of application to the production of oxygen-rich gas using other than the specific structure shown. For example, the churn 8 might be provided, if desired, with the gas conduit 7 extending vertically along the side wall thereof, and having a plurality of jets or ports for injecting the air at a plurality of successive levels into the churn, in order to provide contact of the liquid with an oxygen-nitrogen mixture that is substantially constant throughout the travel of liquid in the churn, since the liquid and gas travel in parallel directions in the churn, and consequently the liquid, as it approaches the top of the churn, comes into contact with a gas in which the oxygen content has been considerably diminished. It is therefore apparent that the particular structure of the churn disclosed is for purposes of description only, as is the case with the chambers 24 and 34. The function performed by the churn can be effected through an infinite variety of mechanical structures, and the invention is not to be limited to the specific structure disclosed.

Inasmuch as various modifications and changes may be made in the design and construction of the present structure, without in any manner departing from the broad underlying principles upon which the invention is based, we do not intend to limit ourselves to the exact structural details shown, but only in so far as defined by the scope and spirit of the appended claims.

We claim:

1. The method of producing oxygen-rich gas from air which comprises passing compressed atmospheric air into intimate contact with water having approximately 3% to 4% sugar added thereto, said water having a preferential solubility such that oxygen is dissolved therein at a faster rate than nitrogen, removing the undissolved portion of said compressed air from contact with said water, and liberating the oxygen enriched gas from said water at reduced pressure, said water being returned for re-contact with fresh compressed air.

2. In the process described, the combination of the following steps: continuously circulating through a closed circuit a stream of liquid which has a preferential absorbing capacity for oxygen as compared to nitrogen, at one point in the circuit injecting a stream of air in said stream of liquid under a pressure materially in excess of atmosphere to form a mixture of air and said liquid at said pressure, at another point in the circuit dividing said mixture while under said pressure into a plurality of thin films and rubbing said films between relatively moving plates to produce a minute subdivision of the air within the liquid of the film and to produce repeated changes in interface contact, all while the air and liquid are maintained under said pressure to promote selective absorption of oxygen by said liquid, discharging said liquid from between said plates at another point in the circuit and allowing gravity separation of the unabsorbed gases from the liquid while retaining said liquid with absorbed gas under said pressure, then at another point in the circuit subjecting the stream of liquid to a reduction of pressure to liberate the absorbed gases which are rich in oxygen, and moving the liquid under pressure back to the point of air injection.

3. The process set forth in claim 2 further characterized by the use of mineral seal oil as the absorbing liquid.

4. In the process described, the novel combination of steps comprising continuously circulating through a closed circuit a stream of liquid which has a preferential absorption capacity for one constituent gas of a mixture of gases, at one point in the circuit injecting a stream of said gas mixture under a selected pressure materially above atmosphere into the stream of liquid at a rate which will permit the formation of a mixture of the liquid and gas with liquid as the external phase under said selected pressure, at another point providing a substantial body of said mixture of gas and liquid under said selected pressure and dividing said body of mixture into a series of thin films, grinding said films between plates which have relative motion to produce an entrainment of the gas in finely subdivided form in said liquid with liquid as the external phase and to produce repeated changes of interface contact of the gas and liquid under said selected pressure, to promote the selective absorption of said constituent gas, discharging the said liquid with entrained gas from between said plates and at another point in said circuit subjecting the liquid and entrained gas while under said selected pressure to gravity separation to disentrain the unabsorbed gases, at another point in the circuit subjecting the liquid with absorbed gases to a decrease in pressure to release the aforesaid constituent gas, and returning the liquid under pressure to the initial point aforesaid.

5. In the process of concentrating a constituent gas appearing in a mixture of gases, the novel combination of steps which comprises circulating continuously through a closed circuit a liquid which has a preferential absorbing capacity for said constituent gas relative to the other gases in said mixture, at one point in the circuit bringing the mixture of gases and the liquid stream into contact under a selected pressure materially above atmosphere, and causing the gas to be mixed with and entrained in said stream of liquid and carried along with the same under said pressure, passing the mixture of gas and liquid between closely spaced plates to subdivide the same into thin films, moving said plates relative to each other to grind said films between them to promote the absorption of the said constituent gas by said liquid, then while still retaining said mixture under pressure allowing separation of the unabsorbed gases from the liquid, and thereafter at a later point in the circuit reducing the pressure upon the liquid containing absorbed gas to cause said liquid to liberate the absorbed gases, which are thereby richer in said constituent gas than the original mixture of gases treated.

6. The aforesaid process defined in claim 5 further characterized by the use of a mineral oil relatively free of volatile constituents under the aforesaid conditions of use and of a gravity not lower than kerosene.

7. In the known art of producing from air a mixture of gases of a substantially higher oxygen content than air through the preferential absorption by a suitable liquid of oxygen as compared to nitrogen, the improvement which comprises driving a stream of liquid through a definite path; at one point in the path injecting compressed air at a selected pressure materially above atmosphere into the stream of liquid to produce a mixture of said air and liquid at said selected pressure and with the liquid carrying the entrained air along in the stream; mechanically churning said mixture of liquid and entrained air in such manner as to secure a high degree of subdivision of the air in the mixture and an extensive repetition of change in interface contact of the subdivided air with the liquid as the external continuous phase while under substantially said selected pressure and while the mixture is moving along said path to promote the absorption of oxygen gas by the liquid; at another point in said path and while said mixture is retained under substantially said selected pressure separating out and removing the unabsorbed gases from said stream of mixture, and at another point in said path reducing the pressure upon the liquid to liberate from the liquid the absorbed gases to produce an oxygen enriched mixture of gases.

8. The process of claim 7 further characterized by the use as an absorbing liquid of a mineral oil which under the conditions of use in the aforesaid process is relatively free of volatile constituents and is of a gravity not lower than that of kerosene.

9. In the known art of oxygen concentration from air by selective absorption, the improvement which comprises driving a stream of absorbing liquid through a closed liquid circuit; at one point in the circuit injecting compressed air at a selected pressure materially above atmosphere into the liquid to produce a mixture of air and liquid wherein the air is carried along in the stream; churning the mixture by mechanical agitation while under substantially said selected pressure in such manner as to produce a high degree of subdivision of the air in the liquid with repeated changes of interface contact, the liquid being in external continuous phase to promote absorption of oxygen by the liquid while the liquid is moving along said path; at another point in the path separating out and removing the unabsorbed gas while retaining the liquid with absorbed gas under substantially said selected pressure; and thereafter at a further point in said path reducing the pressure upon the liquid to liberate the absorbed gases whereby a yield of gases richer in oxygen than the air is produced.

HARRY C. PEFFER,
    Deceased,
By MARY CAROLINE PEFFER,
    Executrix.
GEORGE H. SHEPARD.
GEO. W. SHERMAN, Jr.